(12) United States Patent
Moselage, III (10) Patent No.: US 10,737,760 B2
(45) Date of Patent: Aug. 11, 2020

(54) MULTI-BOX WING SPAR AND SKIN

(71) Applicant: The Boeing Company, Chicago, IL (US)

(72) Inventor: John H. Moselage, III, Rento, WA (US)

(73) Assignee: The Boeing Company, Chicago, IL (US)

( * ) Notice: Subject to any disclaimer, the term of this patent is extended or adjusted under 35 U.S.C. 154(b) by 569 days.

(21) Appl. No.: 15/390,657

(22) Filed: Dec. 26, 2016

(65) Prior Publication Data

US 2017/0106968 A1   Apr. 20, 2017

Related U.S. Application Data

(62) Division of application No. 13/685,049, filed on Nov. 26, 2012, now Pat. No. 9,527,575.

(51) Int. Cl.
| | |
|---|---|
| *B64C 3/18* | (2006.01) |
| *B64C 1/26* | (2006.01) |
| *B64F 5/10* | (2017.01) |
| *B29C 70/34* | (2006.01) |
| *B64C 3/20* | (2006.01) |
| *B29L 31/30* | (2006.01) |

(52) U.S. Cl.
CPC ............ *B64C 3/185* (2013.01); *B29C 70/347* (2013.01); *B64C 1/26* (2013.01); *B64C 3/20* (2013.01); *B64F 5/10* (2017.01); *B29L 2031/3085* (2013.01); *Y02T 50/43* (2013.01)

(58) Field of Classification Search
CPC ........... B64C 1/064; B64C 1/065; B64C 1/26; B64C 3/182; B64C 3/185
See application file for complete search history.

(56) References Cited

U.S. PATENT DOCUMENTS

| | | | |
|---|---|---|---|
| 4,565,595 A * | 1/1986 | Whitener | ................ B29C 70/08 156/156 |
| 5,348,602 A | 9/1994 | Makarenko et al. | |
| 5,847,375 A | 12/1998 | Matsen et al. | |

(Continued)

FOREIGN PATENT DOCUMENTS

| | | |
|---|---|---|
| DE | 102007019692 A1 | 10/2008 |
| EP | 1070661 A2 | 1/2001 |

(Continued)

OTHER PUBLICATIONS

European Examination Report for Related Gulf Cooperation Council Patent Application No. 2013-25867; Report dated Nov. 7, 2017.

(Continued)

*Primary Examiner* — Joseph W Sanderson
(74) *Attorney, Agent, or Firm* — Miller, Matthias & Hull LLP (57) ABSTRACT

Apparatus and systems provide for the construction of wing sections having a plurality of wing spars abutted against each other to form a contiguous multi-box wing spar layup. An aircraft wing includes a plurality of wing spars configured to be attached to an aircraft fuselage, an upper wing surface, and a lower wing surface. The plurality of wing spars are in a multi-box wing spar layup. The plurality of wing spars, the upper wing surface, and the lower wing surface are composite layers having continuous fibers.

20 Claims, 13 Drawing Sheets

(56) References Cited

U.S. PATENT DOCUMENTS

| | | | | |
|---|---|---|---|---|
| 6,513,757 | B1* | 2/2003 | Amaoka | B64C 3/00 244/117 R |
| 6,561,459 | B2* | 5/2003 | Amaoka | B64C 3/00 244/117 R |
| 7,806,367 | B2* | 10/2010 | Munoz Lopez | B29C 70/342 244/123.7 |
| 7,828,246 | B2 | 11/2010 | Ashton et al. | |
| 8,074,694 | B2* | 12/2011 | Brook | B29C 70/222 156/523 |
| 8,302,908 | B1* | 11/2012 | Kismarton | B64C 1/26 244/119 |
| 8,322,656 | B2 | 12/2012 | Pahl | |
| 8,353,478 | B1* | 1/2013 | Kismarton | B64C 1/26 244/119 |
| 8,708,279 | B2* | 4/2014 | Soula | B29C 70/207 244/123.8 |
| 8,851,422 | B2* | 10/2014 | Dan-Jumbo | B64C 3/20 244/123.1 |
| 9,108,718 | B2* | 8/2015 | Yoshida | B64C 1/061 |
| 9,145,197 | B2* | 9/2015 | Moselage, III | B64C 3/182 |
| 9,216,812 | B2* | 12/2015 | Guinaldo Fernadez | B64C 3/18 |
| 9,527,575 | B2* | 12/2016 | Moselage, III | B64C 3/185 |
| 2002/0195524 | A1* | 12/2002 | Amaoka | B64C 3/00 244/123.2 |
| 2008/0265093 | A1* | 10/2008 | Munoz Lopez | B29C 70/342 244/119 |
| 2009/0072088 | A1* | 3/2009 | Ashton | B64C 3/185 244/124 |
| 2009/0321568 | A1* | 12/2009 | Dehn | B64C 1/0009 244/119 |
| 2010/0133382 | A1* | 6/2010 | Pahl | B64C 1/08 244/120 |
| 2011/0299993 | A1* | 12/2011 | Soula | B29C 70/207 416/226 |
| 2012/0121854 | A1* | 5/2012 | Yoshida | B64C 1/061 428/137 |
| 2012/0211603 | A1* | 8/2012 | Motohashi | B64C 1/12 244/123.1 |
| 2013/0101801 | A1* | 4/2013 | Honorato Ruiz | B64C 3/182 428/167 |

FOREIGN PATENT DOCUMENTS

| | | |
|---|---|---|
| RU | 2030336 C1 | 3/1995 |
| RU | 2087383 C1 | 8/1997 |

OTHER PUBLICATIONS

Examination Report for Related Gulf Cooperation Council Patent Application No. 2013-25867; Report dated Mar. 10, 2018.

Office Action for Related Russian Patent Application No. 2013152199/11; Report dated Oct. 11, 2017.

Chinese Office Action for Related Patent Application No. 201310610861.7; Report dated Mar. 3, 2017.

* cited by examiner

MULTI-BOX WING SPAR AND SKIN

CROSS-REFERENCE TO RELATED APPLICATIONS

The application is a divisional application of U.S. application Ser. No. 13/685,049 filed on Nov. 26, 2012, which is herein incorporated in its entirety.

BACKGROUND

Specific conventional aircraft wing construction varies from manufacturer to manufacturer, but typically has several manufacturing processes in common. One or more wing spars that run the entire length of the wing are placed and secured in a wing construction jig. One or more ribs are attached to the wing spars to give additional support to the wing. After attaching the ribs to the wing spars, a series of wing stringers are coupled to the wing spars, giving additional structural support as well as providing support to a wing skin. After the installation of one or more other features, such as fuel tanks, electronics, etc., as needed, the aircraft wing skin stiffened with stringers is attached to the wing spars and ribs. The wing skin may be attached using various methods, including, but not limited to, the use of rivets or other fasteners. Thereafter, other aircraft wing components are attached to the wing assembly, such as wing flaps, ailerons attached to an aft spar, as well as forward and aft wing control surfaces.

Conventional techniques for constructing wings may use a relatively significant number of parts and may be a time-consuming, laborious process. The number of parts may increase the weight of the wing as well as the complexity of building the wing.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and systems provide for multi-box wing spars and skin using one or more forming mandrels. According to one aspect of the disclosure provided herein, a wing includes several multi-box wing spars for attaching the wing to the fuselage of an aircraft. The wing may have an upper surface, lower surface, and several wing segments. The multi-box wing spars, upper wing surface and lower wing surface may be composite layers formed from substantially continuous fibers.

According to another aspect, a system for forming an aircraft wing includes several mandrels shaped according to the upper, lower, forward and aft surfaces of the aircraft wing. The system also includes a compression apparatus for compressing the several mandrels together to cure layers of composite material on the mandrels. The compression apparatus has aft, top, lower, and forward skin surface tools for applying pressure to the corresponding surfaces of the mandrels.

According to a still further aspect, a fuselage section of an aircraft includes a pair of aircraft wings having upper and lower surfaces. Each wing includes multi-box wing spars, each with an elliptical aperture that defines an interior space of the fuselage section of the aircraft. The multi-box wing spars, upper wing surface, and lower wing surface are composite layers with substantially continuous fibers.

The features, functions, and advantages that have been discussed can be achieved independently in various configurations of the present disclosure or may be combined in yet other configurations, further details of which can be seen with reference to the following description and drawings.

DETAILED DESCRIPTION

The following detailed description provides for wings having multi-box wing spars. As discussed briefly above, conventional aircraft wings are typically constructed using multiple components, including one or more spars, ribs and wing stringers, each performing individual functions. After the wing is constructed, the wing is typically attached to a wing box on the fuselage of the aircraft. In conventional aircraft, the wing box is a reinforced, structural component on the aircraft's fuselage to which the wings are attached.

Conventional aircraft wing construction can be a time-consuming and costly process. Further, if the wing is constructed using certain materials, including polymers or, especially, composite materials, the multiple sections of the wing reduce the availability of relatively long lengths of un-broken material, reducing the strength of the polymers and/or composite materials. For example, when using carbon fiber reinforced thermoplastics, if the surface contains multiple breaks in the fibers, the benefit of using the composite can be reduced, as additional reinforcing structures or material may need to be used to make up for the loss in structural rigidity.

Utilizing the concepts described herein, an aircraft wing may be constructed using a series of forming mandrels that when placed together form the shape of the wing. Composite materials, or other suitable materials, may be applied to each forming mandrel, and thereafter compressed and cured to form a wing having multi-box wing spars. In other configurations, one or more layers of composite materials may be fully or partially cured prior to application of the layers to one or more parts of the forming mandrel. In that configuration, one or more partially or fully cured layers of composite material may be co-bonded with other partially or fully cured layers of composite materials. It should further be appreciated that the concepts described herein relating to an aircraft wing may also be used for other aircraft components, such as a vertical or horizontal stabilizer, without departing from the scope of this disclosure and the accompanying claims.

In the following detailed description, references are made to the accompanying drawings that form a part hereof, and which are shown by way of illustration, specific configurations, or examples. Referring now to the drawings, in which like numerals represent like elements through the several figures, the manufacture of wings having multi-box wing spars will be described. It should be appreciated that a multi-box wing spar constructed according to various configurations disclosed herein may have one or more spars and one or more skins, the present disclosure of which is not limited to any number of spars or skins.

Figure 1:
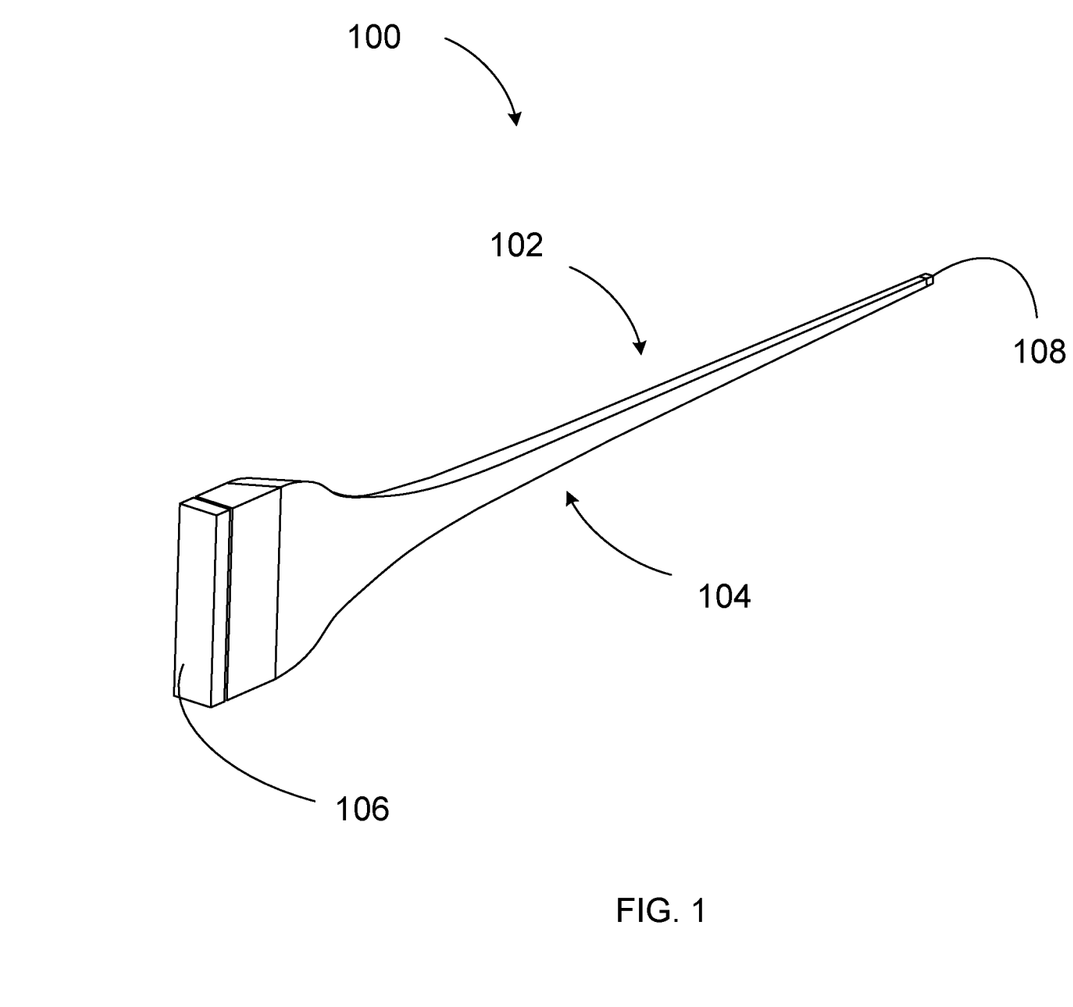
FIG. 1 is a top perspective view of an exemplary mandrel that may be used to form multi-box wing spars, according to various configurations presented herein.

Turning to FIG. 1, is a top perspective view of an exemplary mandrel that may be used to form a wing is illustrated. Forming (or wing) mandrel 100 may have upper surface layer 102 that is shaped according to an upper surface layer of an aircraft wing (shown by way of example in FIG. 12). Forming (or wing) mandrel 100 may also have lower surface layer 104 that is shaped according to a lower surface layer of an aircraft wing. Upper surface layer 102 and lower surface layer 104 may be shaped so that when one or more layers of composite material, such as carbon fiber reinforced thermoplastic, is applied to mandrel 100, the resulting shape is in the shape of an aircraft wing. Further, upper surface layer 102 and lower surface layer 104 may be shaped so that there are little to no bends or breaks in the fibers of the composite material, providing for increased rigidity from the composite material.

As will be described in more detail below, when forming a structure using composite materials, it is typically preferable to not only avoid unnecessary bends or breaks in the material, but also to maintain the straightness of the fibers running in one or more portions of the material. In typical composite materials, it may be preferable to have straight fibers in the composite material matrix. It should be appreciated that the present disclosure is not limited to the use of straight fibers in a composite matrix. Various configurations of the present disclosure may be implemented in the construction of wings having composite matrices using curved or straight fibers, or combinations thereof.

If it is desired or necessary to straighten the fibers in a composite fiber matrix prior to curing, mandrel 100 may also have tension blocks 106 and 108. Tension blocks 106 and 108 may be used separately or in conjunction with one another to "pull" the fibers of a composite matrix, thus providing for a straightened fiber matrix. In some configurations, fibers in a composite matrix (described in more detail below) may be attached to one or both of tension blocks 106 and 108 or may be formed around tension blocks 106 and/or 108. Tension blocks 106 and 108 may be configured to extend outwards from mandrel 100 at various pressures to provide for a tension on the fibers in the fiber matrix.

Figure 2:
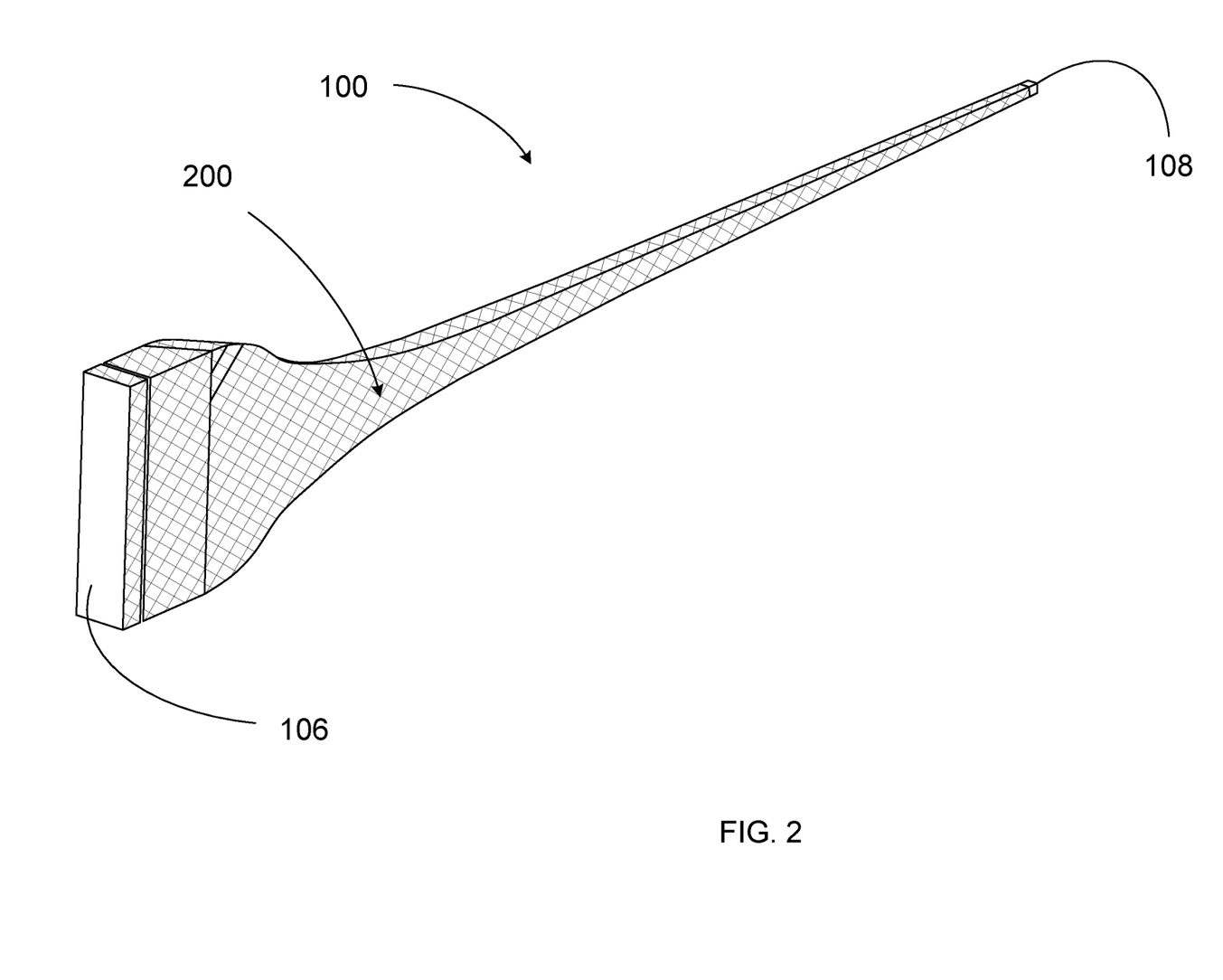
FIG. 2 is a top perspective view of an exemplary mandrel that may be used to form a wing illustrating the application of a filament wound bias ply to the mandrel, according to various configurations presented herein.

A configuration of the construction of the fiber matrix, as discussed briefly above, and the forming of a wing having multi-box wing spars are now described in relation to FIGS. 2-12. In FIG. 2, a first layer of filament wound bias ply 200 (illustrated in a cross-hatch pattern over the surface of mandrel 100) is wrapped or applied to mandrel 100. If needed or desired, filament wound bias ply 200 may have tension applied thereto using tension block 106 and/or tension block 108 to help straighten the fibers in filament wound bias ply 200.

Figure 3:
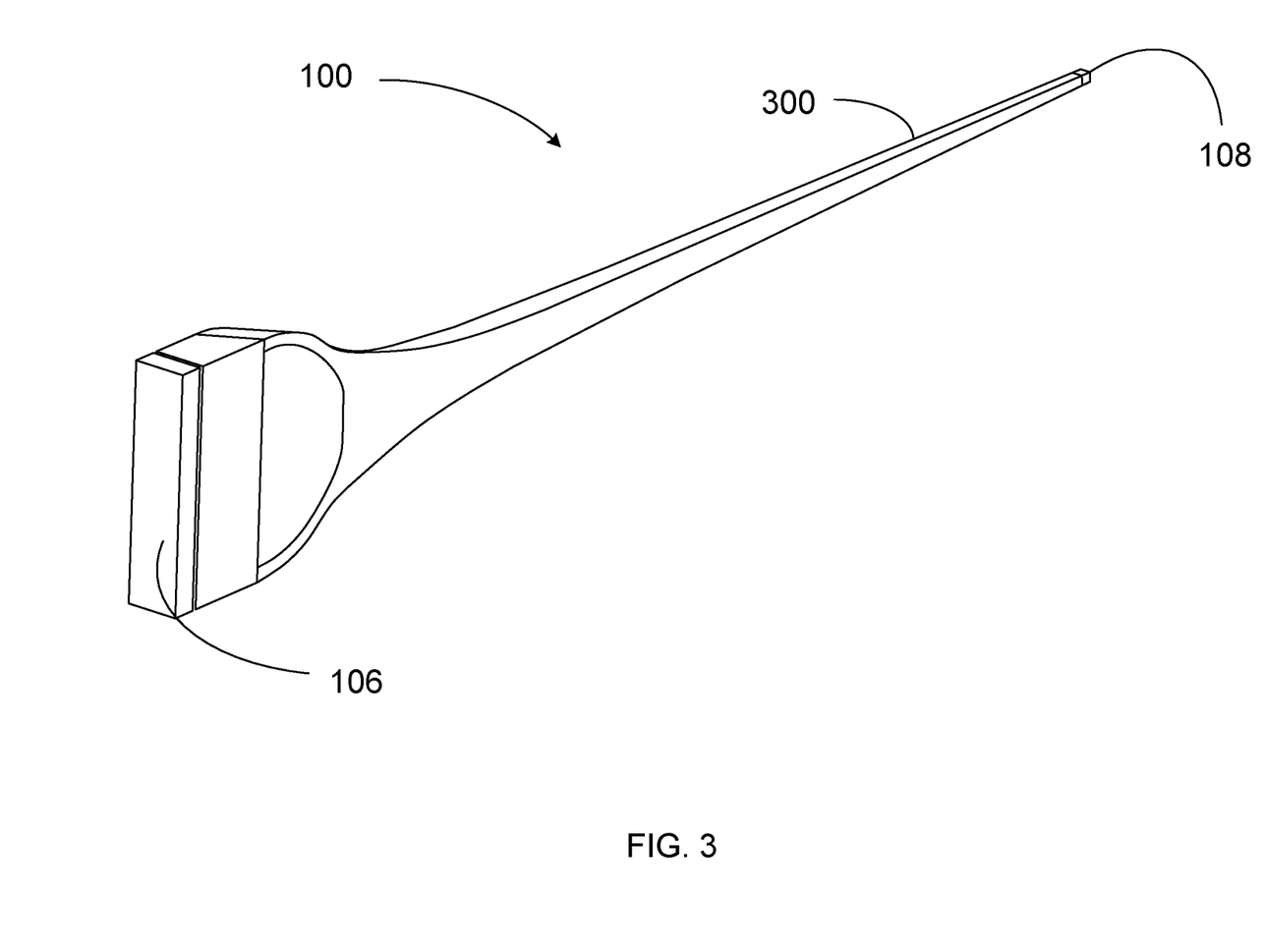
FIG. 3 is a top perspective view of an exemplary mandrel that may be used to form a wing illustrating the application of a uni-ply to the mandrel, according to various configurations presented herein.

After the filament wound bias ply 200 is applied to mandrel 100, a uni-ply layer is applied, as shown in FIG. 3. Uni-ply layer 300 is applied to mandrel 100 and may be tightened using tension block 106 and/or tension block 108. It should be understood that the present disclosure is not limited to any specific configuration of bias-ply or uni-ply. For example, one or more layers of a bias-ply layer may be added prior to the addition of a uni-ply layer. In the same manner, one or more layers of uni-ply may be added between the applications of the one or more bias-ply layers.

Further it should be understood that the present disclosure is not limited to any number of layers of either type of layer, as various combinations may be used to achieve structural or cost goals. For example, and not by way of limitation, it may be desirable or necessary to add sufficient layers of wound bias-ply and/or uni-ply to achieve a desired wing thickness or structural rigidity. Additionally, it should be understood that the present disclosure is not limited to a layer having a single type of ply, as some configurations may use a combination of bias- and uni-ply within the same layer. Various combinations may be used according to various configurations without departing from the scope of this disclosure and the accompanying claims.

Figure 4:
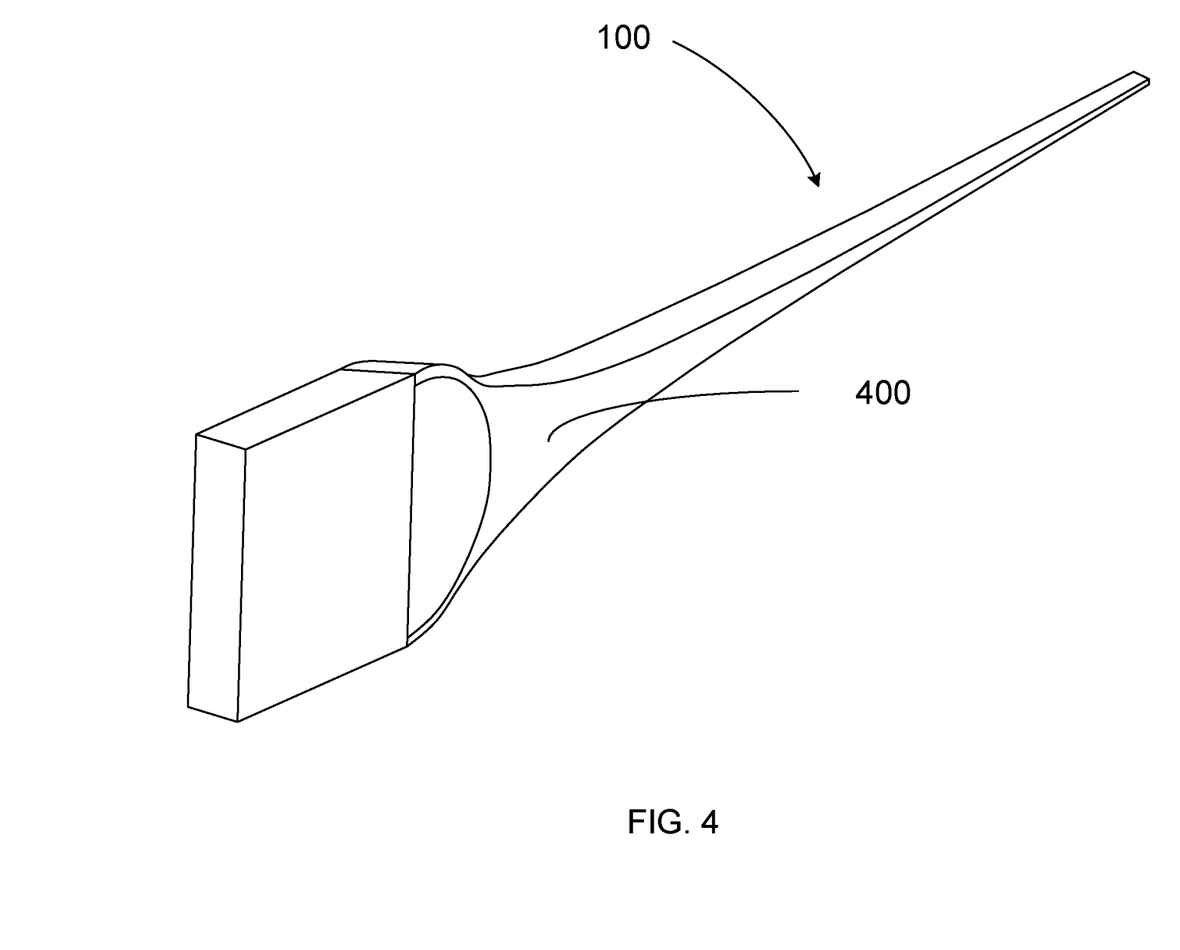
FIG. 4 is a top perspective view of an exemplary mandrel that may be used to form a wing illustrating a finished layup on the mandrel, according to various configurations presented herein.

FIG. 4 illustrates a completed composite matrix 400 on mandrel 100. Composite matrix 400 may be formed using various layering and application techniques, such as, by way of example, the method described above in relation to FIGS. 2 and 3.

Figure 5:
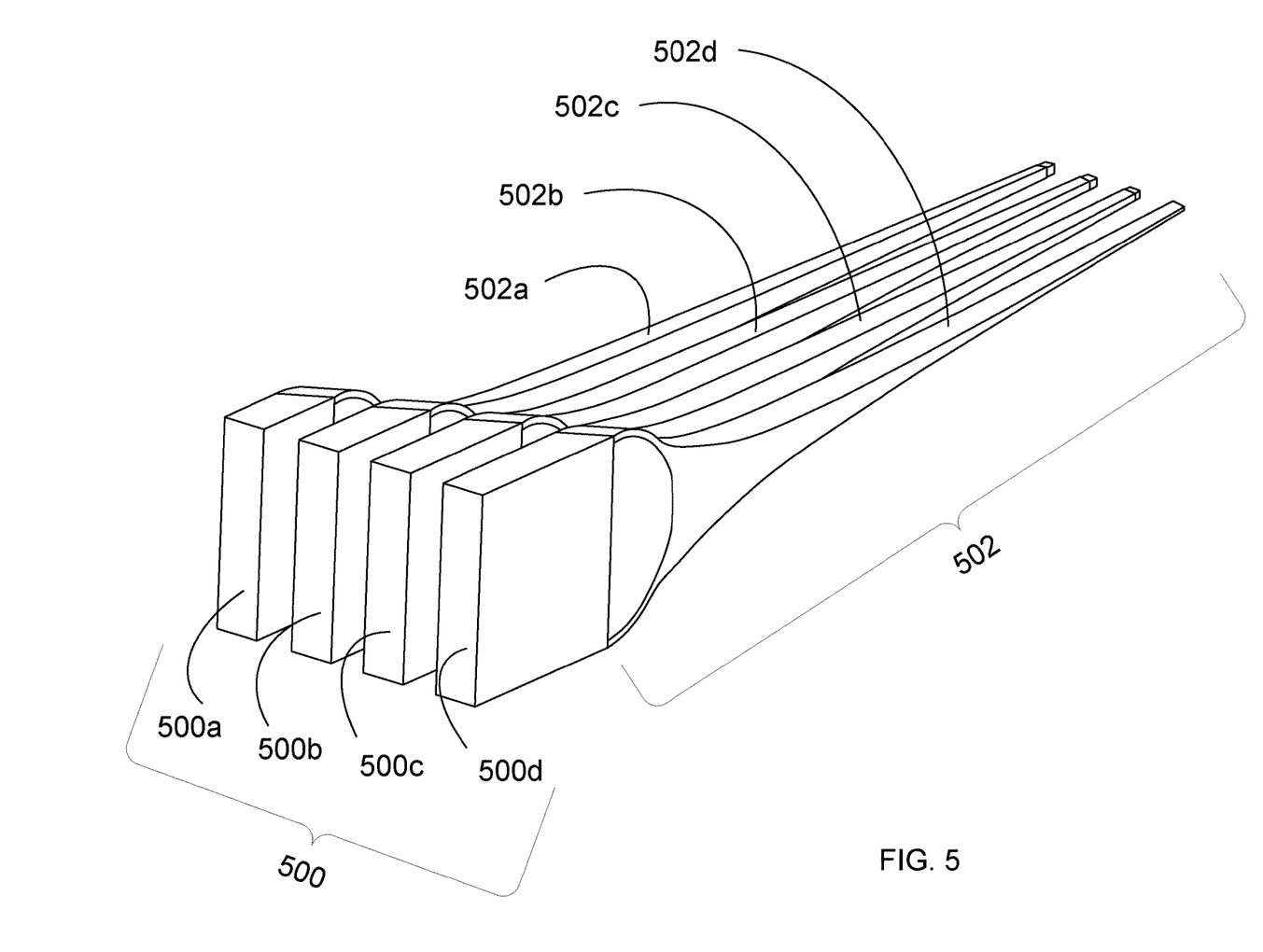
FIG. 5 is a top perspective view of a plurality of exemplary mandrels that may be used to form a wing, according to various configurations presented herein.

FIG. 5 is a top perspective view of a series of mandrels having fully formed composite matrices applied thereon. Mandrel apparatus 500 has individual mandrels 500*a-d*. Mandrels 500*a-d* have disposed thereon composite matrix 502, having individual composite matrices 502*a-d*. Composite matrix 502 may be formed from one or more layers, various combinations of plies, and may be fully or partially uncured at this point. As illustrated in FIG. 5, the general shape of an aircraft wing may be seen when viewing mandrel apparatus 500.

Figure 6:
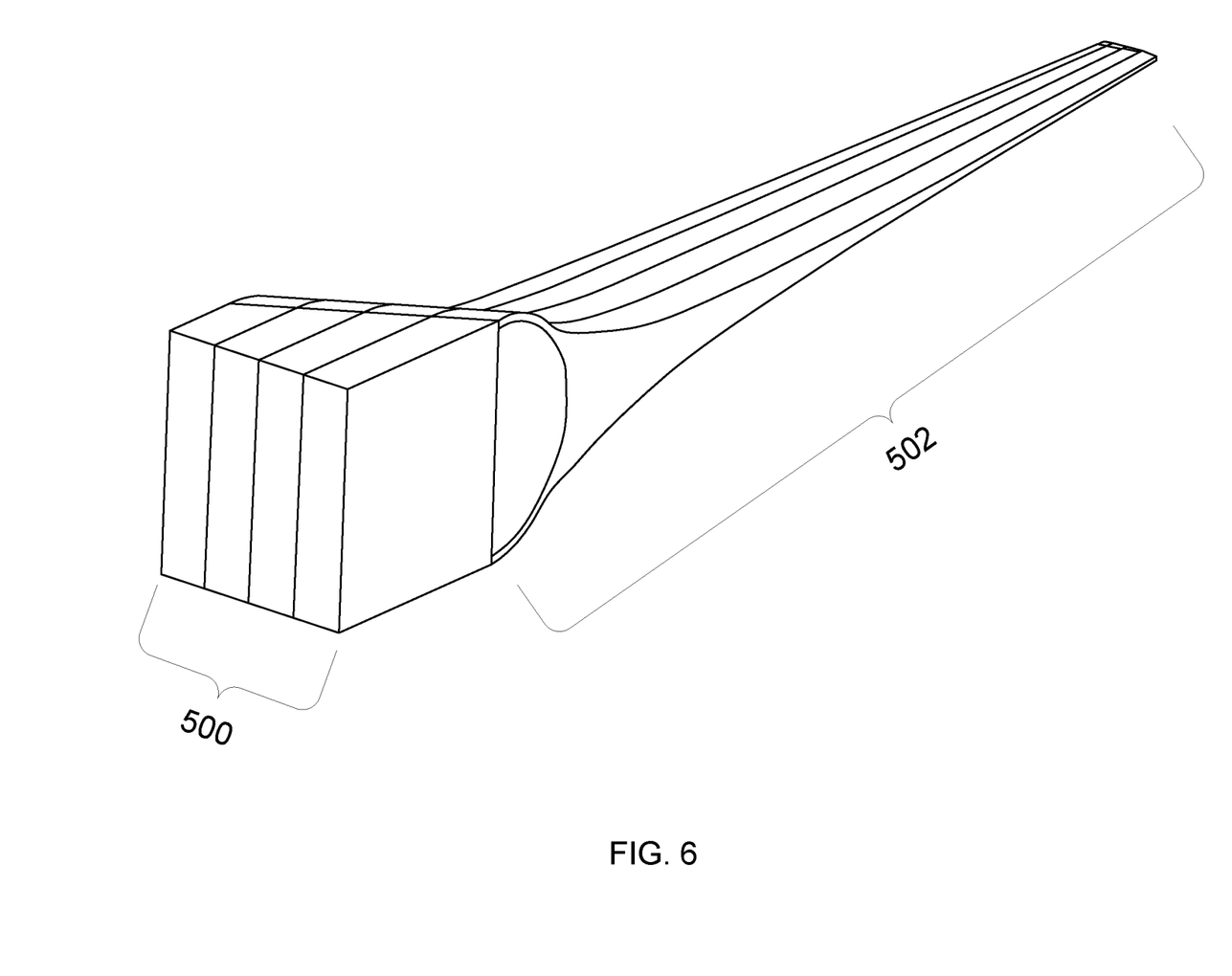
FIG. 6 is a top perspective view of a plurality of exemplary mandrels that are abutted to each other, according to various configurations presented herein.

According to various configurations, after composite matrix 502 is applied to mandrel apparatus 500, mandrels 500*a-d* are abutted against each other, as shown in FIG. 6. Individual mandrels (illustrated by way of example as mandrels 500*a-d* in FIG. 5) are abutted to form a contiguous, multi-box wing spar layup, having composite matrix 502, which is formed from multiple composite matrices (illustrated by way of example as composite matrices 502*a-d* in FIG. 5).

Figure 7:
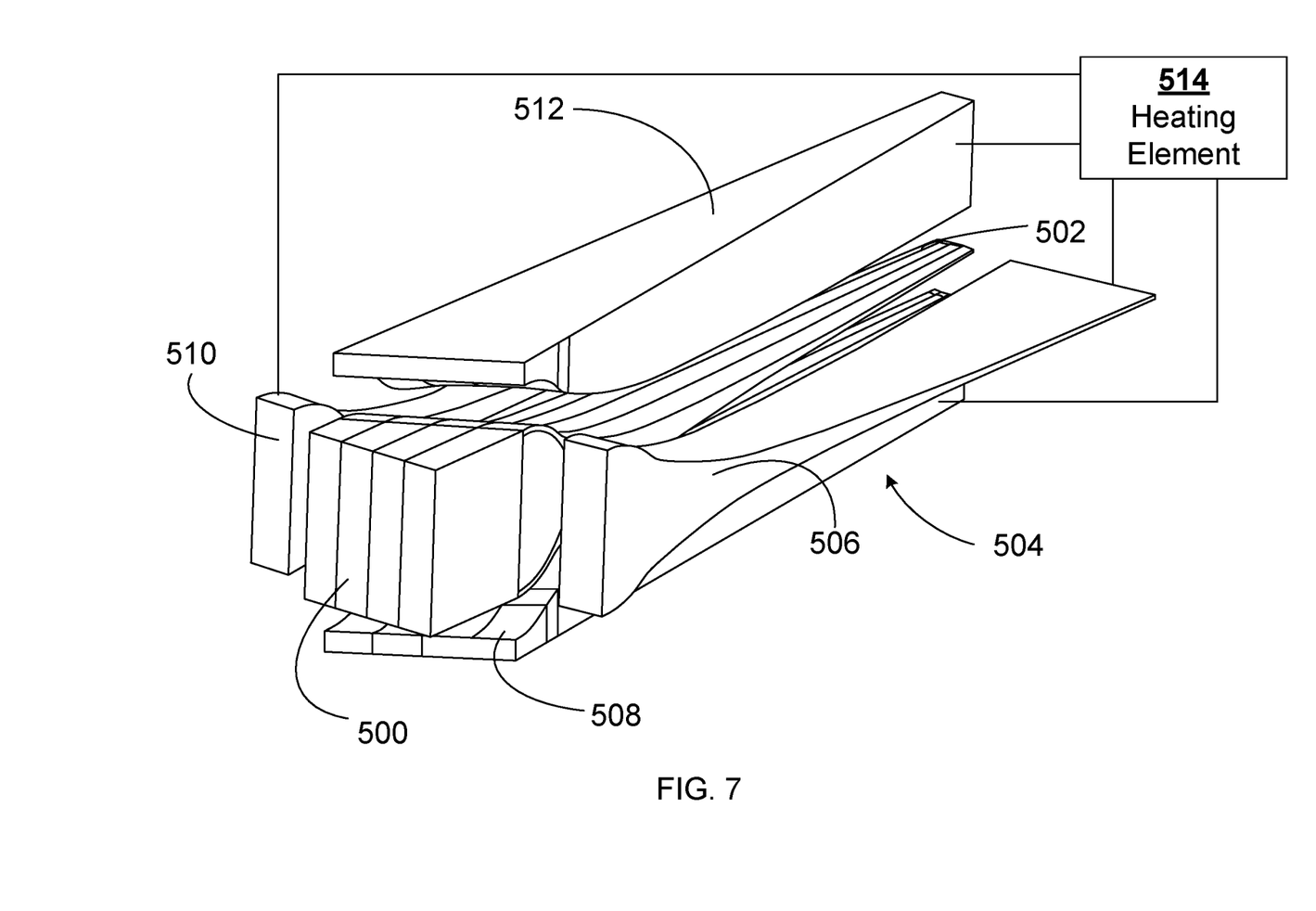
FIG. 7 is a top perspective view of wing surface tooling prior to compression, according to various configurations presented herein.

In order to partially or fully cure and form the multi-box wing spar configuration according to various configurations of the present disclosure, a curing system may be used. As discussed above, one or more layers of composite material may be fully or partially cured prior to use in a forming mandrel. In that configuration, the partially or fully cured composite layers may be co-bonded to other partially or fully cured composite layers using one or more layers of adhesive to secure the layers of composite material within a composite matrix. An example of a system for forming multi-box wing spars is shown in FIG. 7. After the individual mandrels forming mandrel apparatus 500 are abutted to each other, thus forming composite matrix 502 from a series of individual composite matrices, a series of surface tools may be applied to the various surfaces of mandrel apparatus 500. It should be appreciated that additional material may be added across the surface of the spar after the mandrels that form mandrel apparatus 500 are abutted. The additional material may be used to form the skin of the wing, reinforce the composite material already in place, or provide for various aerodynamic or physical properties, by way of example.

Various processes for adding the additional bias-ply and uni-ply are known to those in the art, to which the various configurations disclosed herein are not dependent on any one particular method of applying composite materials. In one configuration, a curable upper wing skin, a curable lower wing skin, a curable leading wing edge and a curable trailing wing edge may be applied after the initial plies are added to the composite matrix 502, prior to the application of surface tools to the composite matrix 502.

Figure 8:
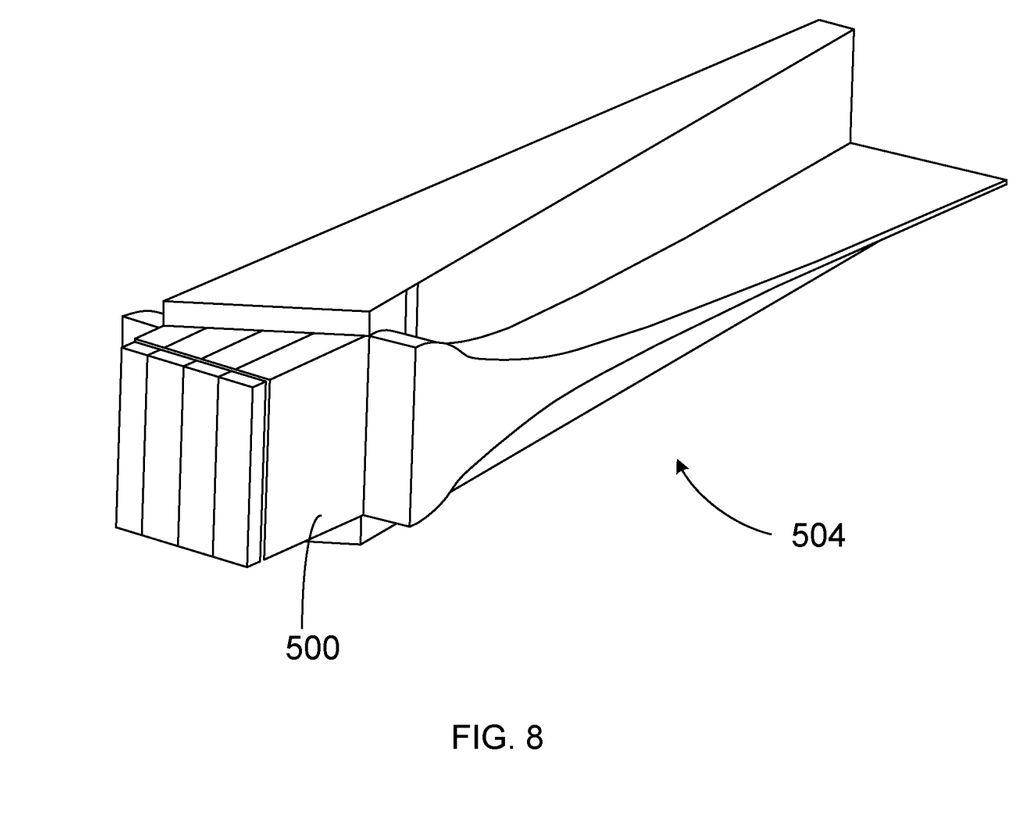
FIG. 8 is a top perspective view of wing surface tooling during compression, according to various configurations presented herein.

Compression apparatus 504 has forward skin surface tool 506, lower skin surface tool 508, aft skin surface tool 510 and top skin surface tool 512. It should be further appreciated that not all of the material added is "curable" material, as non-curable material may be added to composite matrix 502. Surface tools 506, 508, 510 and 512 are individually or collectively compressed, thus applying pressure, onto the respective surfaces of mandrel apparatus 500 to help form and cure composite matrix 502. In some configurations, heating element 514 may be applied to one or more of surface tools 506-512. The combination of pressure and heat may fully or partially cure composite matrix 502 in a desired amount of time or may provide for additional structural rigidity. Heating element 514 may use various means of applying heat to composite matrix 502, including steam and electrical current. FIG. 8 illustrates compression apparatus 504 in a compressed state, with mandrel apparatus 500 shown outside of compression apparatus 504.

Figure 9:
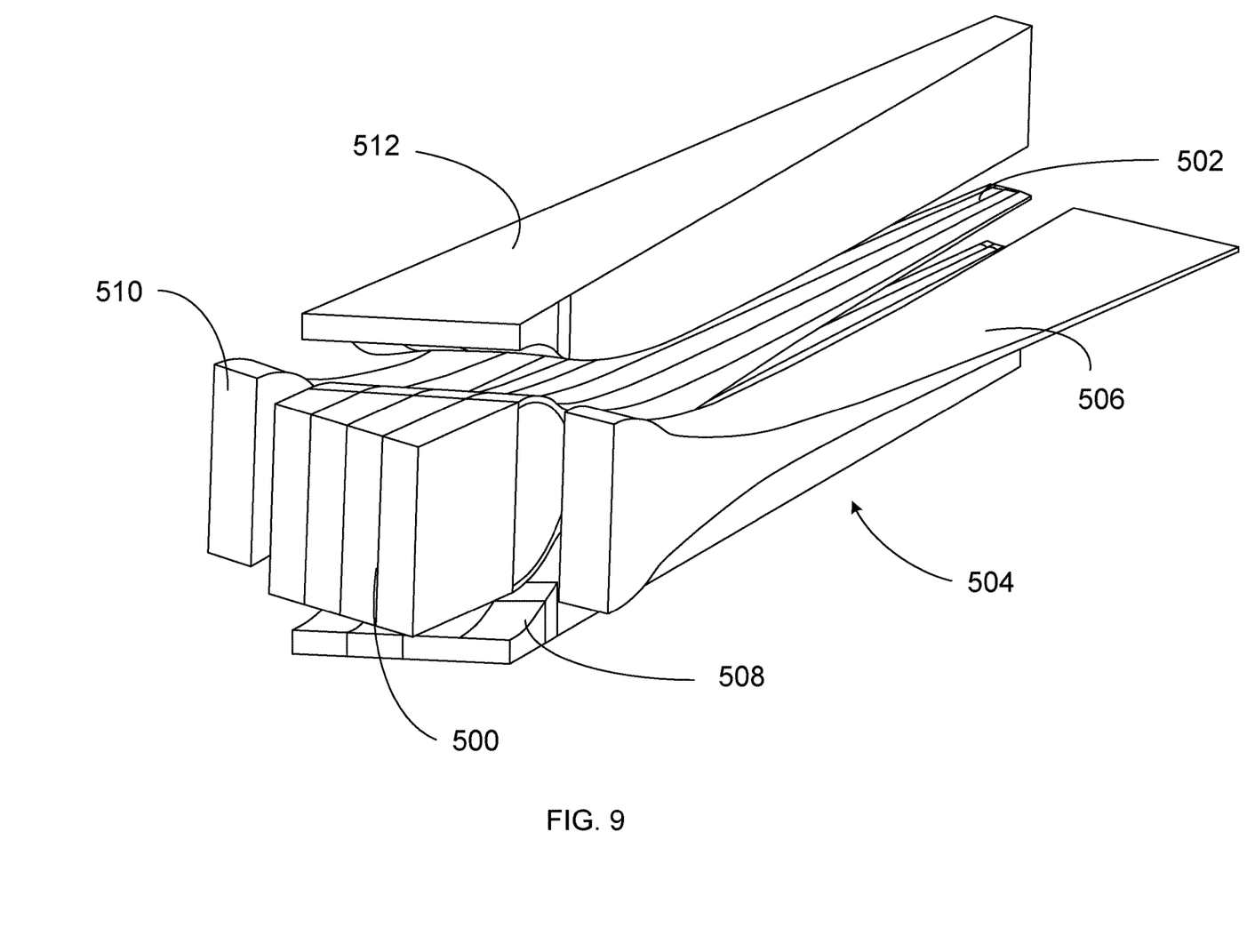
FIG. 9 is a top perspective view of wing surface tooling being removed after curing, according to various configurations presented herein.
Figure 10:
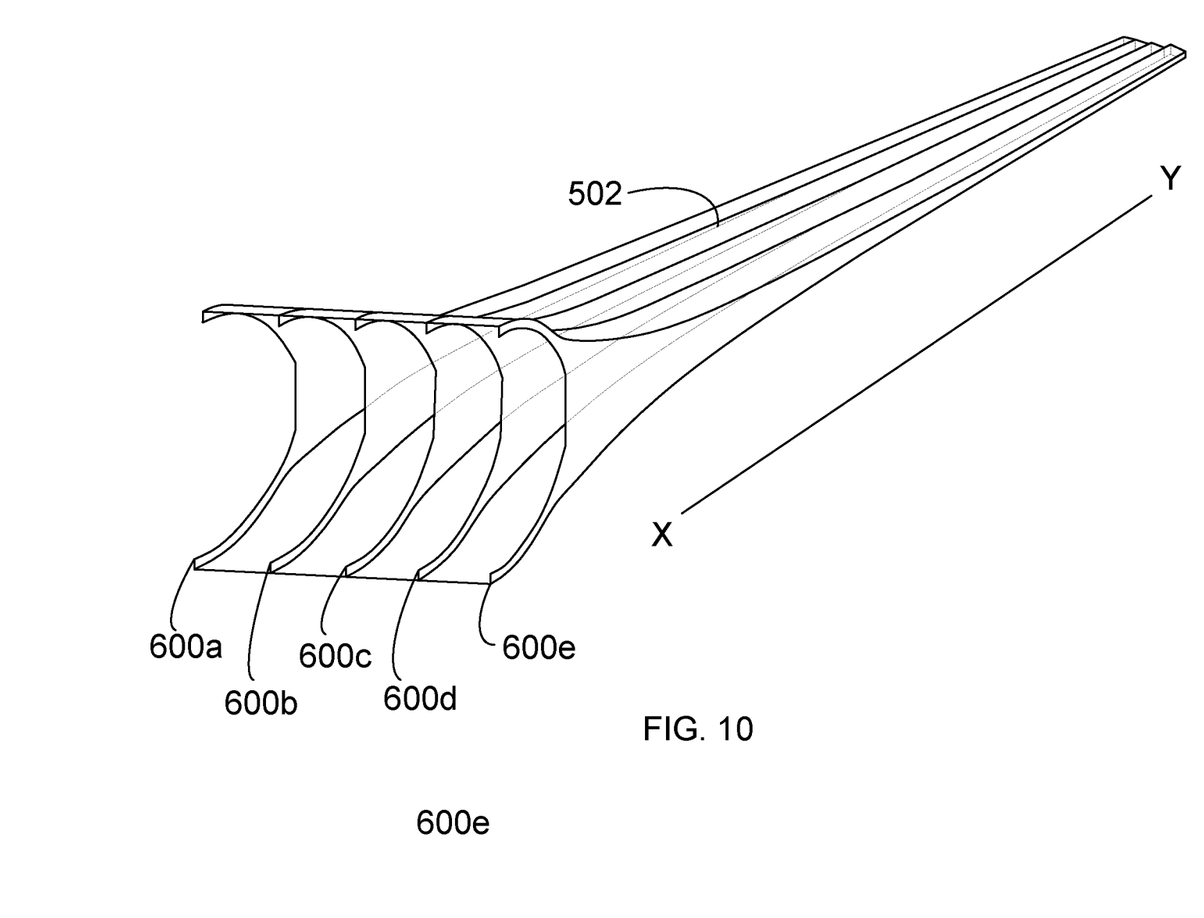
FIG. 10 is a top perspective view of a wing having multi-box wing spars and skin after the removal of the wing surface tooling and mandrels, according to various configurations presented herein.
Figure 11:
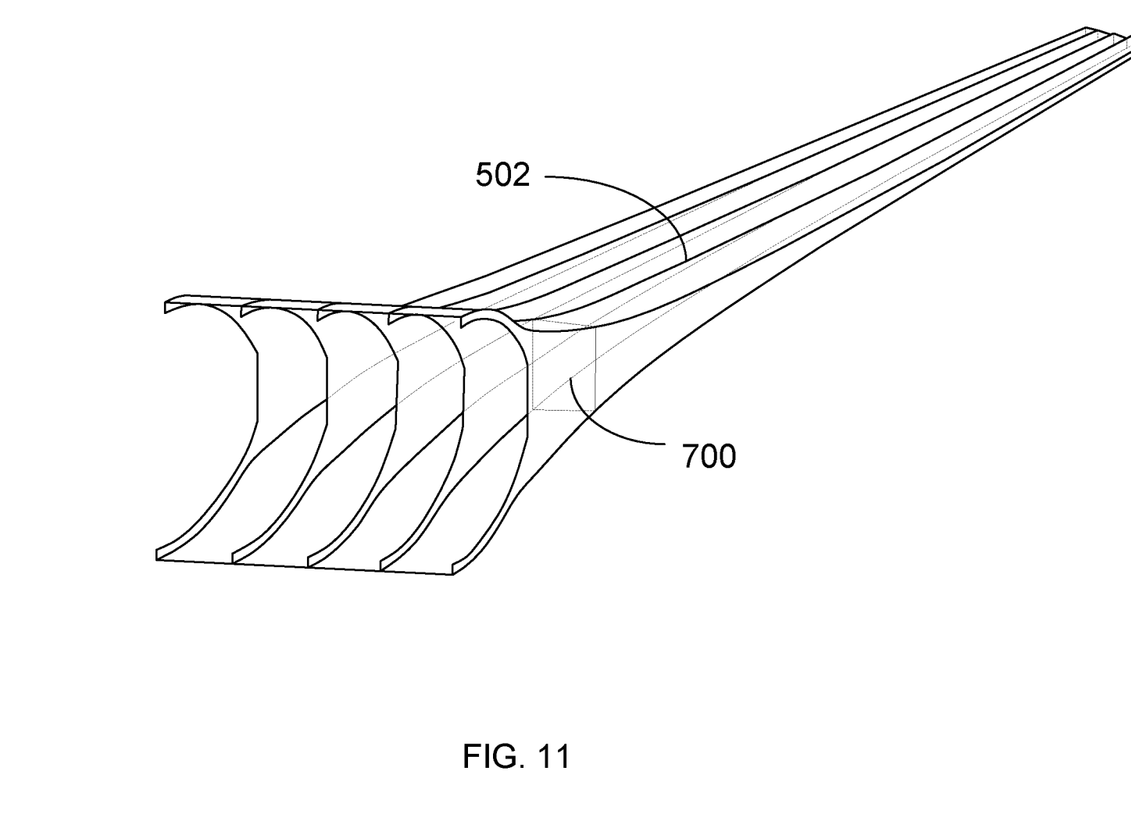
FIG. 11 is a top perspective view of a wing having multi-box wing spars and skin after the removal of the wing surface tooling and mandrels, further illustrating the installation of a vertical rib, according to various configurations presented herein.

Once composite matrix 502 is cured to a desired level, compression apparatus 504 is removed, illustrated in greater detail in FIG. 9. Compression apparatus 504 surface tools 506, 508, 510 and 512 are removed from the surface of now-cured composite matrix 502 and individual mandrels of mandrel apparatus 500 are extracted from composite matrix 502. The resulting structure is illustrated in FIG. 10. It should be appreciated that the present disclosure is not limited to fully curing composite matrix 502, as it may be desired or necessary in some configurations to remove the curing mechanisms (e.g. compression apparatus 504 or heating element 514) prior to composite matrix 502 being fully cured. Various degrees of curing may be used according to various configurations of the present disclosure without departing from the scope of this disclosure and the accompanying claims.

FIG. 10 is a top perspective illustration showing composite matrix 502 with multi-box wing spar. By using composite materials formed over abutting mandrels, composite matrix 502 has disposed therein spars 600*a-e* that extend internally to composite matrix 502 along axis X-Y, thus forming multi-box wing spars. By using a mandrel apparatus, such as mandrel apparatus 500 of FIG. 7, it can be seen that composite matrix 502 may be formed having fibers disposed therein that can be straightened and uncut (or undesirably terminated). After curing, composite matrix 502 may be considered a singular, contiguous structure. If it is desirable or necessary to further reinforce composite matrix 502, one or more ribs may be installed in composite matrix 502, an example of which is shown by rib 700 in FIG. 11.

Figure 12:
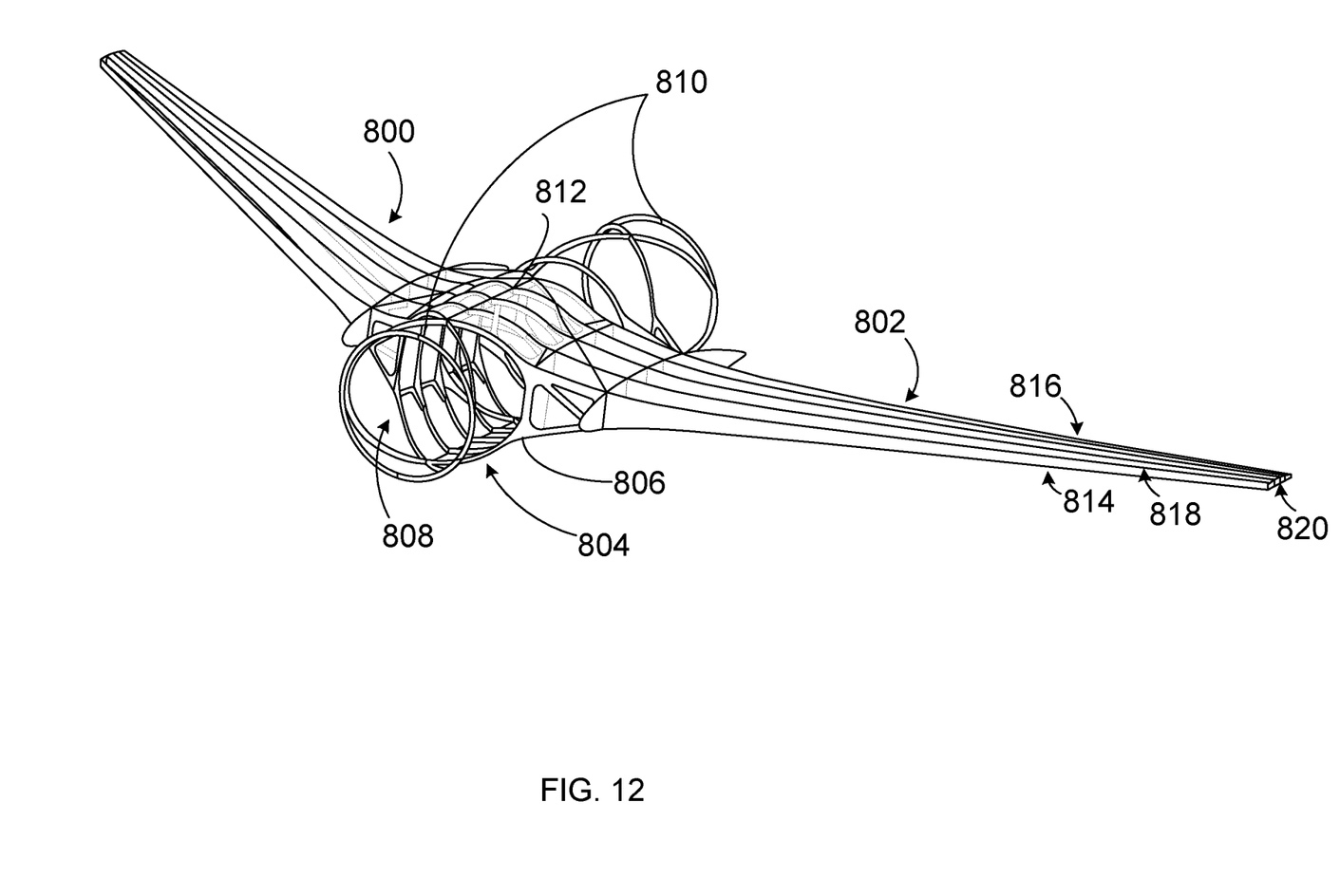
FIG. 12 is a top perspective view of a fuselage section with two wings having multi-box wing spars, according to various configurations presented herein.

Further, utilizing the concepts described herein, a wing formed according to various configurations disclosed herein may be coupled to a fuselage section of an aircraft without the need for a conventional wing box. Exemplary techniques are described in copending patent application entitled, "Vertically Integrated Stringers," having U.S. application Ser. No. 13/685,049 and filed on Nov. 26, 2012, which is hereby incorporated herein in its entirety. FIG. 12 illustrates one such configuration in which a wing formed according to the techniques described herein is attached to a fuselage without the use of a traditional wing box. It should be appreciated that the concepts presented herein may also be used to form a wing according to the techniques described herein to be attached to a traditional wing box.

Composite matrices 800 and 802, which are constructed according to various configurations disclosed herein, have multiple wing spars that can be coupled to fuselage section 804. It should be appreciated that composite matrices 800 and 802 may be formed in various shapes with various features, the present disclosure of which is not limited to any one particular configuration. Exemplary wing spar 806 is identified in FIG. 12 for the sake of clarity, though it should be understood that composite matrices 800 and 802 may have additional wing spars. Exemplary wing spar 806 may have elliptical aperture 808.

Depending on the angular displacement between composite matrices 800/802 and fuselage section 804, elliptical aperture 808 may vary in circumference and shape, i.e. the foci of elliptical aperture 808 may change as well as the radii. For example, in a straight-wing profile aircraft in which spar 806 may be affixed to fuselage section 804 at approximately a 90 degree angle, elliptical aperture 808 may be circular. In another example, such as the one illustrated in FIG. 12, spar 806 may be attached to fuselage section 804 in a swept-wing profile. Thus, elliptical aperture 808 may be more oval in shape in order to provide for interior space in the aircraft and to be attached to the fuselage circumferentially. One or more circumferential fuselage stringers, such as stringers disclosed in copending application entitled "Vertically Integrated Stringers" and identified as circumferential stringers 810, may provide additional structural support to fuselage section 804. The multi-box wing spars formed by composite matrices 800 and/or 802 may be attached to one or more beams of an aircraft fuselage, such as crown beam section 812. It should be appreciated that fuselages may have one or more types of beams including, but not limited to, crown beam 812 or a keel beam (not shown).

FIG. 12 also illustrates the various sections of a wing that may be formed using various configurations disclosed herein. Composite matrix 802 is illustrated as having a leading wing edge 814, trailing wing edge 816, upper surface layer 818 and lower surface layer 820. One or more of the leading wing edge 814, the trailing wing edge 816, the upper surface layer 818 and the lower surface layer 820 may be curable or bondable according to various configurations disclosed herein. Further, one or more of the leading wing edge 814, the trailing wing edge 816, the upper surface layer 818 and the lower surface layer 820 may be formed separately from the others and attached afterwards. In some configurations, the leading wing edge 814 and/or the trailing wing edge 816 may be formed with the upper surface layer 818 and/or the lower surface layer 820. Thus, in a compression apparatus, such as compression apparatus 504 of FIG. 7, the leading wing edge 814 may be a forward skin formed using the forward skin surface tool 506 of FIG. 7 and the trailing wing edge 816 may be an aft skin surface formed using the aft skin surface tool 510.

Figure 13:
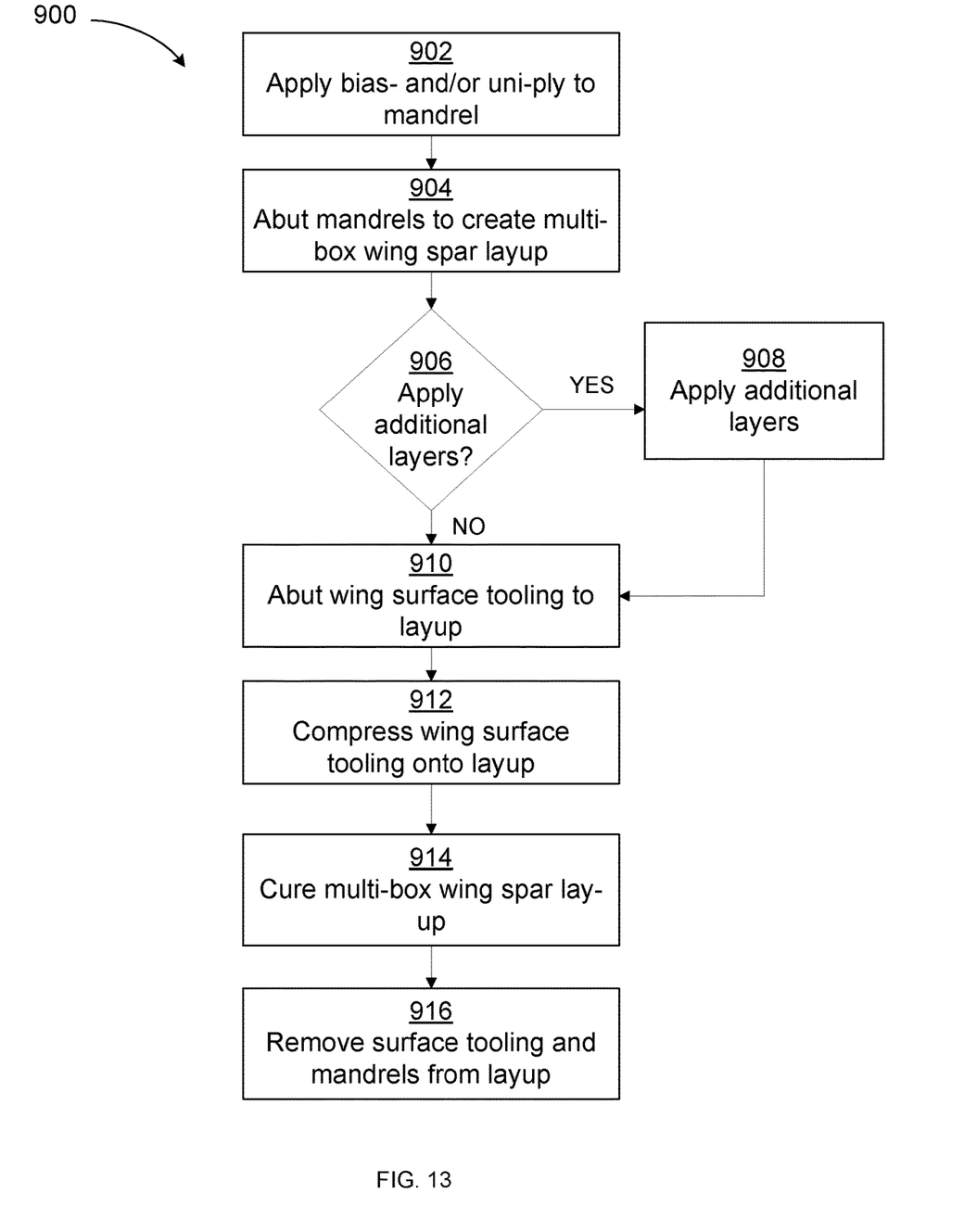
FIG. 13 is an illustrative routine for manufacturing multi-box wing spars, according to various configurations presented herein.

Turning now to FIG. 13, an illustrative routine 900 for constructing multi-box wing spars is described in detail. Unless otherwise indicated, it should be appreciated that more or fewer operations may be performed than shown in the figures and described herein. Additionally, unless otherwise indicated, these operations may also be performed in a different order than those described herein.

Routine 900 begins at operation 902, where one or more bias- and/or uni-plies are applied to a series of forming mandrels. In some configurations, the fibers in the bias- and/or uni-plies can be tightened through the use of one or more tension blocks on the mandrel. From operation 902, routine 900 continues to operation 904, whereby the forming mandrels are abutted to each other to create a multi-box wing spar layup. In some configurations, the multi-box wing spar layup comprises a composite matrix formed from one or more layers of the bias- and/or uni-plies. As noted above, additional plies may be added at various stages of the forming process.

From operation 904, routine 900 continues to decision 906, wherein a determination is made if additional layers of uni-ply or bias-ply are to be added prior curing of the composite matrix. In one configuration, it may be desirable to form and cure together the multi-box wing spars and one or more portions of the wing skin. In another configuration, a desired wing thickness or structural rigidity may require that additional plies be added. If the determination 906 is that additional ply layers are to be added, routine 900 continues to operation 908, wherein the additional layers are applied to the layup.

If it was determined 906 that no additional layers to the layup are to be applied 908, or after the additional layers to the layup have been applied 908, routine 900 continues to operation 910, whereby surface tooling is applied (abutted) to the various surfaces of the composite matrix. The surface tooling, in some configurations, may serve several functions. For example, surface tooling may have one or more surfaces configured to create certain shapes in the surface of the composite matrix. Surface tooling may also be used to apply pressure and/or heat to a composite matrix to cure the composite matrix as well as, in some examples, provide for debulking of the composite matrix during layup.

From operation 910, routine 900 continues to operation 912, whereby the surface tooling is compressed onto the composite matrix to being the curing process. In some configurations, it may be desirable to, in addition to pressure, apply heat to one or more surface tools, heating various surfaces of the composite matrix. Thus, operation 912 may also include a heating operation.

From operation 912, routine 900 continues to operation 914, whereby the composite matrix in the multi-box wing spar layup is cured. In some further configurations, it may be desirable at operation 912 and/or operation 914 to apply tension to the plies within the composite matrix from one or both ends of the composite matrix to reduce the amount of wrinkles of fibers within the composite matrix and to increase the straightness of the fibers within the composite matrix. Once the curing cycle is completed, routine 900 continues to operation 916, whereby the surface tooling (and heat) is removed from the composite matrix. Further, the mandrels are extracted from the composite matrix, forming wing sections having multi-box wing spars.

Based on the foregoing, it should be appreciated that technologies for constructing wing sections having multi-box wing spars have been presented herein. The subject matter described above is provided by way of illustration only and should not be construed as limiting. Various modifications and changes may be made to the subject matter described herein without following the example configurations and applications illustrated and described, and without departing from the true spirit and scope of the present disclosure, which is set forth in the following claims.

What is claimed is:

1. An aircraft comprising:
   a first aircraft wing and a second aircraft wing, the first and second aircraft wings comprising:
   a plurality of wing spars comprising an elliptical aperture, an upper wing surface, and
   a lower wing surface,
   wherein:
      the plurality of wing spars are abutted against each other to form a contiguous multi-box wing spar layup;
      the plurality of wing spars, the upper wing surface, and the lower wing surface are composite layers comprising continuous fibers; and
      the elliptical aperture of each wing spar defines an interior space of the aircraft.

2. The aircraft of claim 1, wherein either one or both of the first aircraft wing and the second aircraft wing further comprises a plurality of ribs disposed within the plurality of wing spars.

3. The aircraft of claim 1, wherein either one or both of the first aircraft wing and the second aircraft wing further comprises a leading wing edge and a trailing wing edge comprising composite layers co-cured with the plurality of wing spars, the upper wing surface, and the lower wing surface.

4. The aircraft of claim 1, wherein foci of the elliptical aperture provide an angular displacement between a fuselage section and the first aircraft wing and between the fuselage section and the second aircraft wing, wherein the angular displacement provides for a straight-wing profile or a swept-wing profile.

5. The aircraft of claim 1, wherein at least one of the plurality of wing spars of the first aircraft wing is attached to at least one of a plurality of wing spars of the second aircraft wing.

6. The aircraft of claim 1, further comprising one or both of a forward skin and an aft skin that are co-cured with the plurality of wing spars.

7. The aircraft of claim 1, wherein the composite layers comprising continuous fibers are co-cured or co-bonded composite layers.

8. The aircraft of claim 1, wherein the plurality of wing spars are created by a plurality of bias-ply and uni-ply layers encompassed over a plurality of mandrels, and the plurality of mandrels abutting against one another such that a bias-ply or uni-ply layer encompassing each of the plurality of mandrels abuts a bias-ply or uni-ply layer encompassing an adjacent separated wing mandrel.

9. The aircraft of claim 8, wherein the plurality of wing spars are further created by compressing a plurality of wing surface tooling to apply a pressure to the plurality of wing spars in the multi-box wing spar layup.

10. The aircraft of claim 1, wherein the elliptical aperture is a circular aperture.

11. An aircraft comprising:
a first aircraft wing and a second aircraft wing, the first and second aircraft wings comprising:
a plurality of wing spars comprising an aperture,
an upper wing surface, and
a lower wing surface,
wherein:
the plurality of wing spars are abutted against each other to form a contiguous multi-box wing spar layup;
the plurality of wing spars, the upper wing surface, and the lower wing surface are composite layers comprising continuous fibers; and
the aperture of each wing spar defines an interior space of a fuselage of the aircraft.

12. The aircraft of claim 11, wherein either one or both of the first aircraft wing and the second aircraft wing further comprises a plurality of ribs disposed within the plurality of wing spars.

13. The aircraft of claim 11, wherein either one or both of the first aircraft wing and the second aircraft wing further comprises a leading wing edge and a trailing wing edge comprising composite layers co-cured with the plurality of wing spars, the upper wing surface, and the lower wing surface.

14. The aircraft of claim 11, wherein the aperture is an elliptical aperture and the foci of the elliptical aperture provide an angular displacement between a fuselage section and the first aircraft wing and between the fuselage section and the second aircraft wing, wherein the angular displacement provides for a swept-wing profile.

15. The aircraft of claim 11, wherein the aperture is an elliptical aperture and the foci of the elliptical aperture provide an angular displacement between a fuselage section and the first aircraft wing and between the fuselage section and the second aircraft wing, wherein the angular displacement provides for a straight-wing profile.

16. The aircraft of claim 11, wherein at least one of the plurality of wing spars of the first aircraft wing is attached to at least one of a plurality of wing spars of the second aircraft wing.

17. The aircraft of claim 11, further comprising one or both of a forward skin and an aft skin that are co-cured with the plurality of wing spars.

18. The aircraft of claim 11, wherein the composite layers comprising continuous fibers are co-cured or co-bonded composite layers.

19. The aircraft of claim 11, wherein the aperture is a circular aperture.

20. The aircraft of claim 11, wherein the plurality of wing spars are created by a plurality of bias-ply and uni-ply layers encompassed over a plurality of mandrels, and the plurality of mandrels abutting against one another such that a bias-ply or uni-ply layer encompassing each of the plurality of mandrels abuts a bias-ply or uni-ply layer encompassing an adjacent separated mandrel.

* * * * *